US012613766B2

(12) United States Patent
Goyal et al.

(10) Patent No.: US 12,613,766 B2
(45) Date of Patent: Apr. 28, 2026

(54) SYSTEM AND METHOD FOR PROVIDING ROOT CAUSE CORRECTIVE ACTIONS (RCCA) AND DETERMINING QUALITY SCORE OF THE CORRECTION ACTION THEREOF

(71) Applicant: HONEYWELL INTERNATIONAL INC., Charlotte, NC (US)

(72) Inventors: McMillan Goyal, Bengaluru (IN); Anjeneya Dubey, Atlanta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/588,037

(22) Filed: Feb. 27, 2024

(65) Prior Publication Data

US 2025/0272183 A1     Aug. 28, 2025

(51) Int. Cl.
*G06F 11/00*      (2006.01)
*G06F 11/07*      (2006.01)

(52) U.S. Cl.
CPC ........ *G06F 11/0793* (2013.01); *G06F 11/079* (2013.01)

(58) Field of Classification Search
CPC ............................ G06F 11/0793; G06F 11/079
USPC ...................................................... 714/1–57
See application file for complete search history.

(56) References Cited

U.S. PATENT DOCUMENTS

| | | | | |
|---|---|---|---|---|
| 6,999,990 | B1 * | 2/2006 | Sullivan | H04L 67/02 |
| | | | | 709/224 |
| 7,757,124 | B1 * | 7/2010 | Singh | G06F 11/26 |
| | | | | 714/45 |
| 11,381,474 | B1 * | 7/2022 | Kumar | H04L 41/0897 |
| 2003/0237016 | A1 * | 12/2003 | Johnson | H04L 9/40 |
| | | | | 714/4.1 |
| 2009/0089522 | A1 * | 4/2009 | Kulkarni | G06F 11/1464 |
| | | | | 711/E12.103 |
| 2014/0058594 | A1 * | 2/2014 | Plowman | B64F 5/60 |
| | | | | 701/14 |
| 2020/0226401 | A1 * | 7/2020 | Rajagopal | G06F 18/214 |
| 2021/0240172 | A1 * | 8/2021 | Srivastava | G05B 19/41865 |
| 2023/0333903 | A1 * | 10/2023 | White | G06F 9/505 |

* cited by examiner

*Primary Examiner* — Sarai E Butler

(57) ABSTRACT

The present invention disclosure provides a system for performing root cause analysis, comprising a processor and a memory, the processor is configured to at least one problem associated with running of an application by at least one user, wherein identifying problem includes determining a priority level of one or more services being impacted based on service level agreements, identify at least one root cause associated with the problem, identify one or more root cause corrective actions (RCCA) based on root cause and implement at least one RCCA for troubleshooting the identified problem. Further, the system generates a RCCA form for use by a user group for identifying and validating an additional RCCA and update the database to include the additional RCCA based on a quality score for the identified root cause corrective action. The system is configured to create a RCCA form, auto-fill the RCCA form, identify one or more RCCA implemented for the identified problem, and determine a quality score of the RCCA.

20 Claims, 6 Drawing Sheets

100

108

106

104

Application server interface network

User device 1

User device 2

User device n 102-1

102-2

102-n

SYSTEM AND METHOD FOR PROVIDING ROOT CAUSE CORRECTIVE ACTIONS (RCCA) AND DETERMINING QUALITY SCORE OF THE CORRECTION ACTION THEREOF

FIELD OF INVENTION

The present disclosure generally relates to performing root cause analysis and providing correction actions for resolving issues in an application or service provided to a user. More specifically, the present disclosure provides a system and a method for providing root cause corrective actions (RCCA) and determining quality score of the RCCA.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Generally, a user may have access to one or more products, applications or services provided by the application provider and different applications or services may have different priority levels based on their functionality. Any issues relating to high priority level applications or service may have bigger impact on overall performance of the application and need to be resolved based on its priority level.

Conventionally, the process of identification of priority level of impacted applications or services was a manual process and there was no mechanism to collaborate with the user to identify the root cause and identify the most effective root cause corrective actions. Further, the existing models lacked the technology or provisions to create a platform for discussions or meetings in an automated manner and hence, manual meeting invites were sent for collaboration with stakeholders such as technical members/developers for performing root cause analysis and identifying root cause corrective action. Further, conventionally, manual communication was done for updating the users of an application regarding the status of resolution of the problems or issues within the application. Manual detection of issues is not practicable or scalable to large and complex applications and/or services since prompt detection and response regarding the root cause of anomalous behaviour is a challenging task. A failure to promptly identify and respond to anomalies may result in various problems such as performance degradation, security breaches, and compromised data integrity. Further, existing methods of resolving issues in an application are incapable of mitigating such issues based on correspondence with users of the application, and do not incorporate feedbacks provided by users regarding their satisfaction with the method in which issues have been resolved.

Through applied effort, ingenuity, and innovation, the inventors have solved the above problem(s) by developing the solutions embodied in the present disclosure, the details of which are described further herein.

SUMMARY OF THE INVENTION

In general, embodiments of the present disclosure herein provide determination of root cause corrective actions for an identified problem in execution of applications or services and determining quality score of the determined root cause corrective action through collaboration with the user. Other implementations will be, or will become, apparent to one with skill in the art upon examination of the following figures and detailed description. It is intended that all such additional implementations be included within this description be within the scope of the disclosure and be protected within the scope of the following claims.

In one embodiment, the present disclosure provides a system for performing root cause analysis. The system for root cause analysis comprises at least a processor and a memory storing program instructions which, when executed by the processor, causes the processor to identify at least one problem associated with running of an application, wherein identifying problem includes determining priority level of one or more services being impacted based on service level agreements. Further, the processor is configured to identify at least one root cause associated with said problem and the processor accesses a runbook to identify one or more root cause corrective action (RCCA) associated with the root cause. The processor based on runbook implements the root cause corrective action (RCCA) for the identified root cause. Further, when the root cause corrective action (RCCA) fails to rectify the root cause, the processor is further configured to identify one or more parameters associated with identified application and problem and initiate self-diagnosis of the root cause corrective action. In an aspect, the system generates a RCCA form which is collaborated between stakeholders and users to identify the problem and determine if the root cause corrective action being proposed is successful in resolving the issue and determine a quality score of the root cause corrective action (RCCA). Also, the quality score of the identified root cause corrective action is updated in the RCCA form and said RCCA form is saved in the database.

In another aspect, the present disclosure provides a method for performing root cause analysis, comprising identify at least one problem associated with running of an application, wherein identifying problem includes determining priority level of one or more services being impacted based on service level agreements. The method further comprises accessing the runbook to identify one or more root cause corrective action (RCCA) associated with the root cause and implementing the root cause corrective action (RCCA) for the identified root cause, based on identifying the procedure from runbook. When the root cause corrective action (RCCA) fails to rectify the root cause, the method further comprises identifying one or more parameters associated with identified application and problem and initiate self-diagnosis of the root cause corrective action. The method further comprises generating a RCCA form which is collaborated between stakeholders and users to identify the problem and determine if the root cause corrective action being proposed is successful in resolving the issue and determine a quality score of the root cause corrective action (RCCA). Further, the quality score of the identified root cause corrective action is updated in the RCCA form and said RCCA form is saved in the database.

In yet another embodiment, the present disclosure provides A non-transitory computer-readable storage medium storing program instructions for performing root cause analysis, the instructions, when executed, perform the steps of identifying at least one problem associated with running of an application, wherein identifying problem includes determining priority level of one or more services being impacted based on service level agreements. Further, the instructions when executed performs the steps of accessing the runbook to identify one or more root cause corrective action (RCCA) associated with the root cause and implementing the root cause corrective action (RCCA) for the identified root cause, based on identifying the procedure from runbook. When the root cause corrective action (RCCA) fails to rectify the root cause, the instructions when executed performs the steps of identifying one or more parameters associated with identified application and problem and initiate self-diagnosis of the root cause corrective action. The instructions when executed performs the steps of generating a RCCA form which is collaborated between stakeholders and users to identify the problem and determine if the root cause corrective action being proposed is successful in resolving the issue and determine a quality score of the root cause corrective action (RCCA). Further, the quality score of the identified root cause corrective action is updated in the RCCA form and said RCCA form is saved in the database.

The above summary is provided merely for the purpose of summarizing some exemplary embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:

Having thus described the embodiments of the disclosure in general terms, reference now will be made to the accompanying drawings, which are not necessarily drawn to scale, and wherein:

FIG. 1 illustrates a block diagram of a network architecture of a system for automated performance of root cause analysis and corrective action to resolve issues in an asset, in accordance with an embodiment of the present invention.

Figure 2:
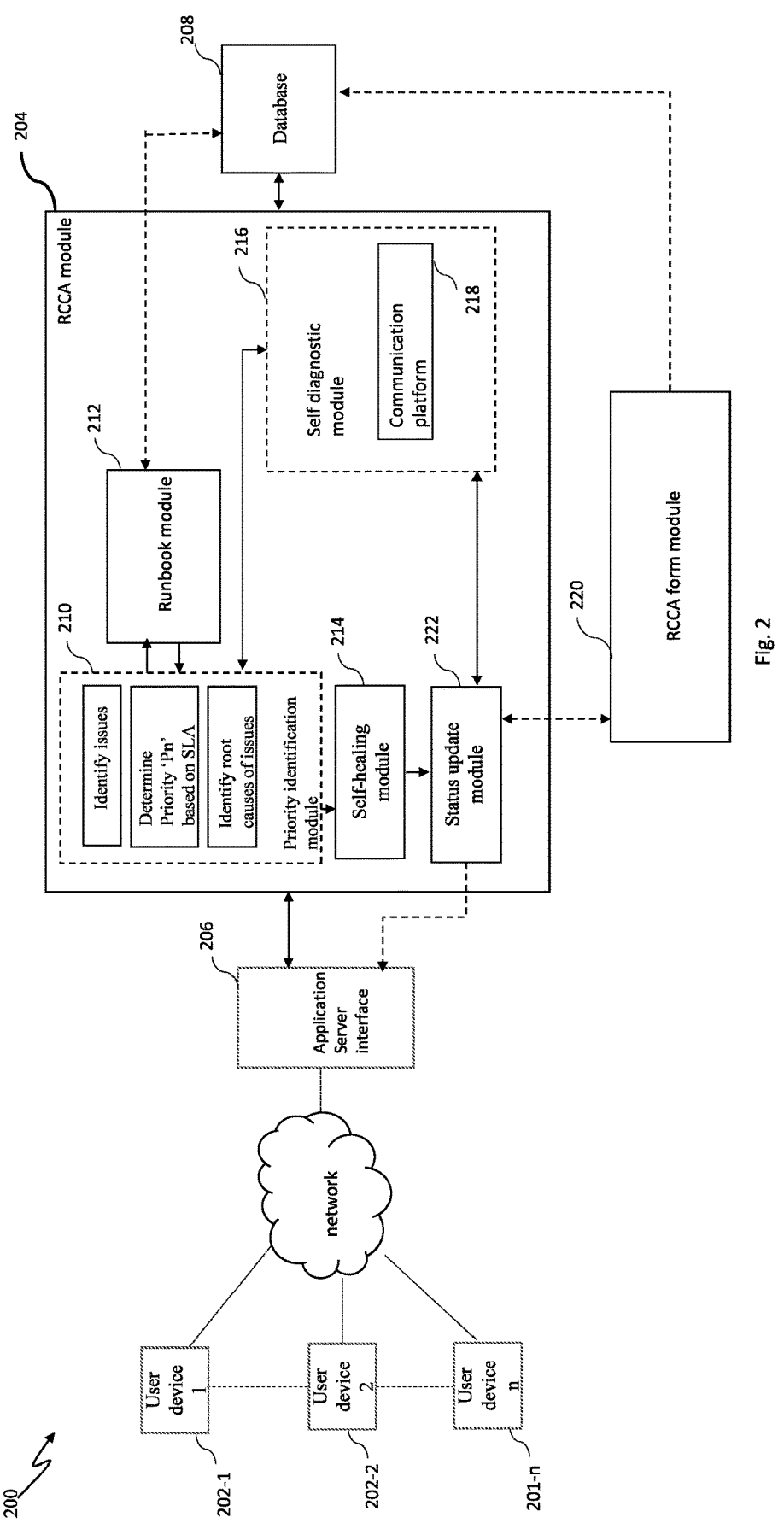

FIG. 2 illustrates a block diagram of module-based operation of the system, in accordance with an embodiment of the present invention.

Figure 3:
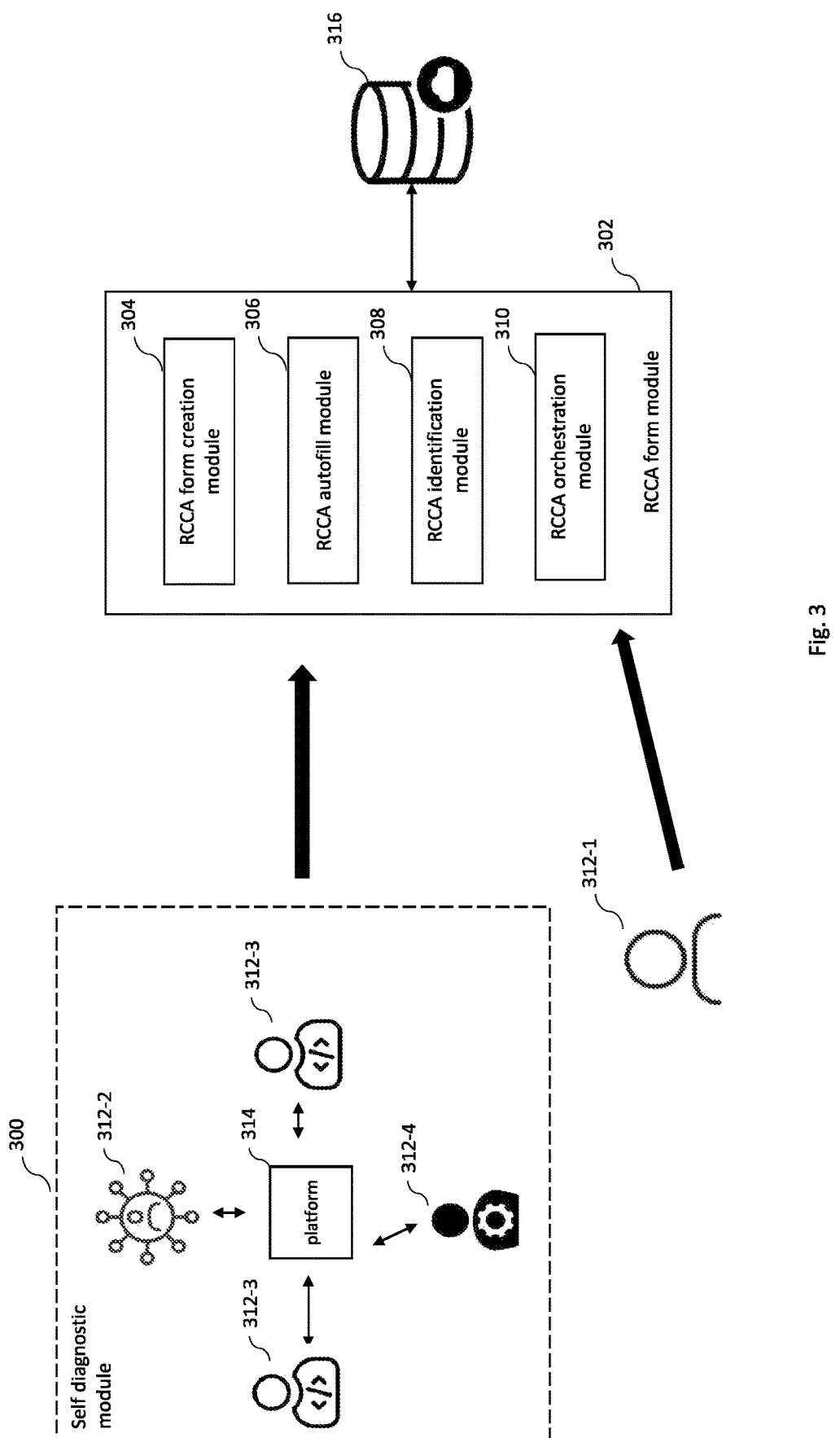

FIG. 3 illustrates a more detailed embodiment of RCCA form module in accordance with an embodiment of the present invention.

Figure 4:
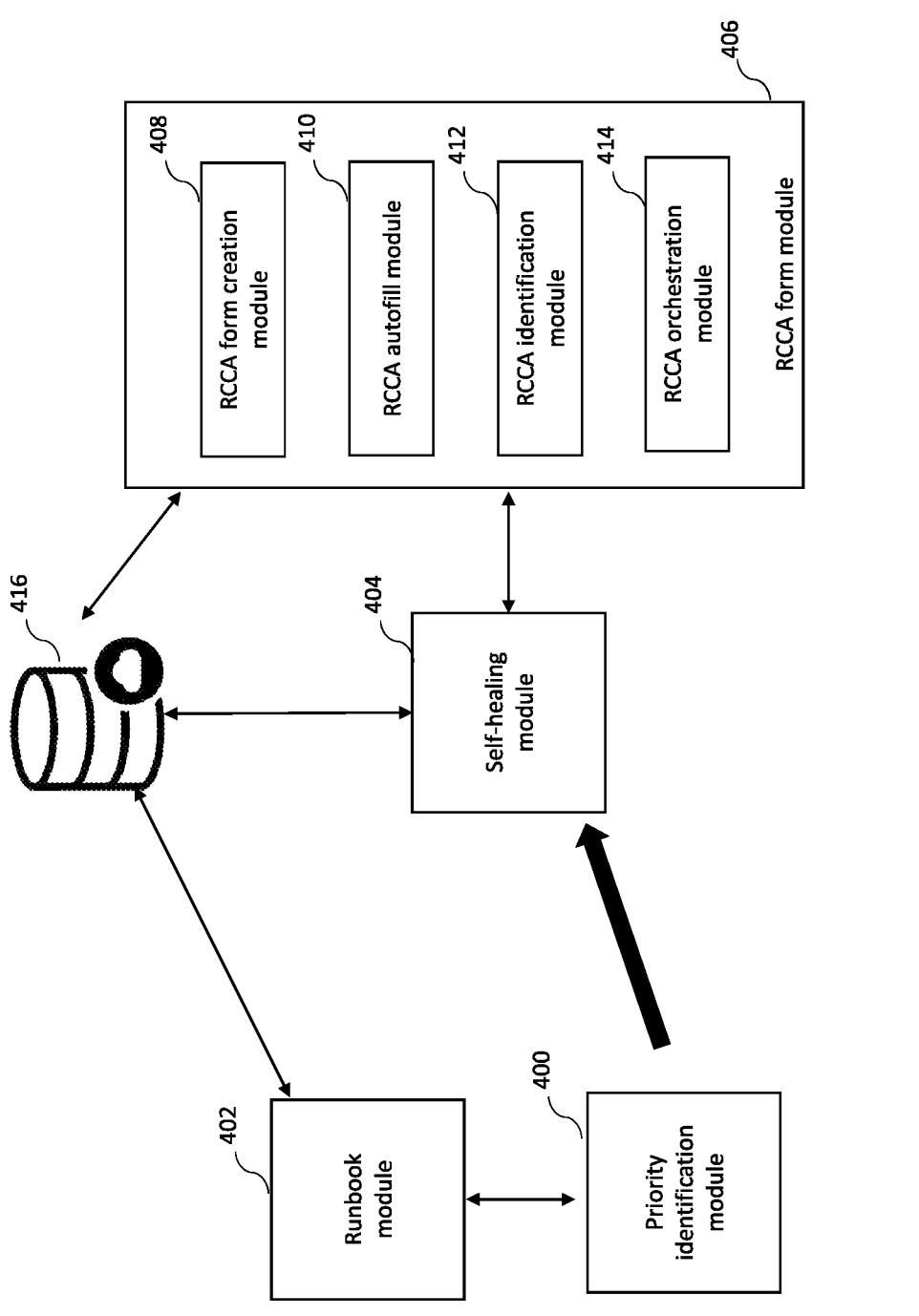

FIG. 4 illustrates an exemplary embodiment for self-healing of root cause and creation of RCCA form in accordance with an embodiment of the present invention.

Figure 5:
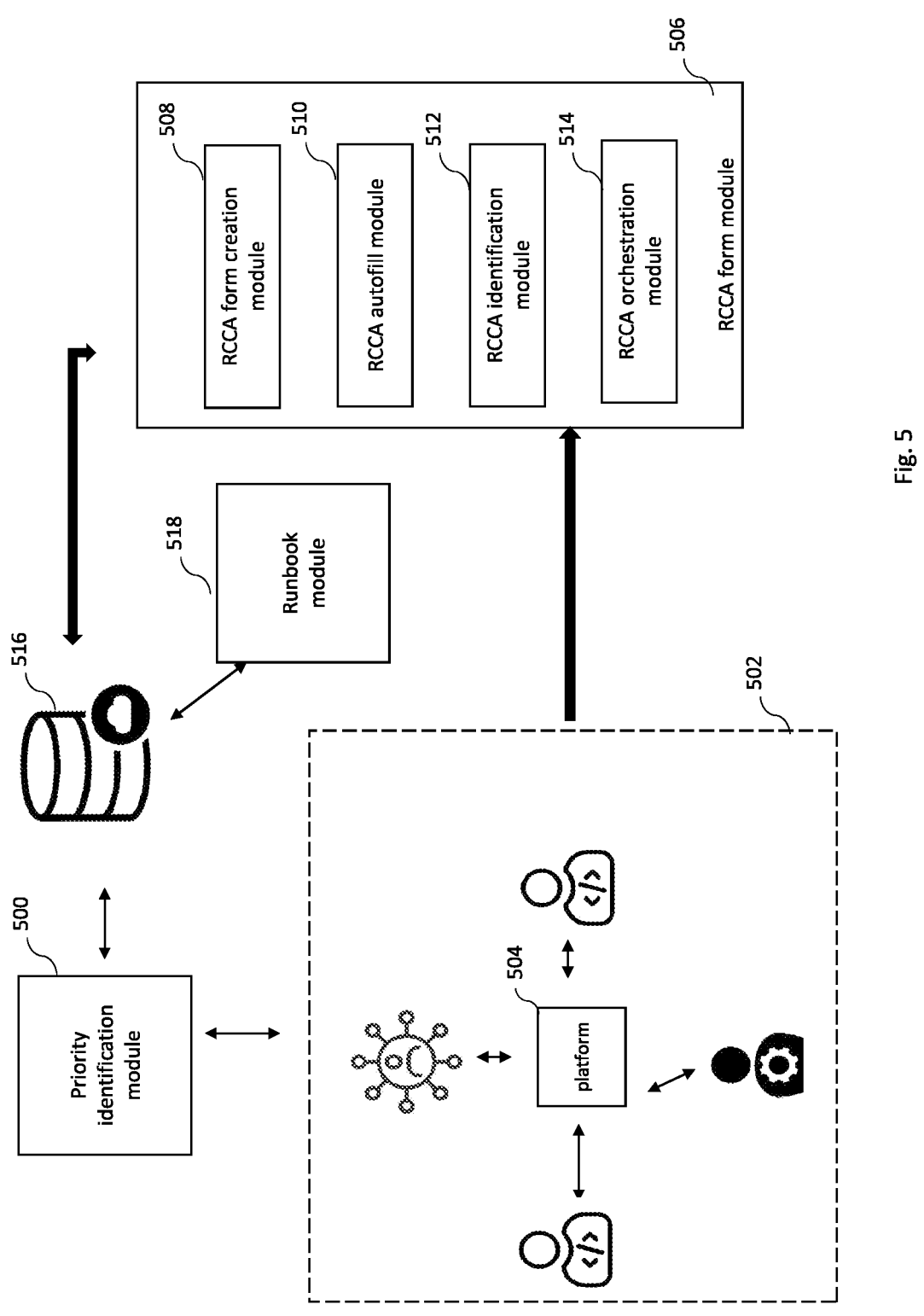

FIG. 5 illustrates an exemplary embodiment for self-diagnosis of root cause, identification of root cause corrective actions and determine quality score of corrective actions based on RCCA form in accordance with an embodiment of the present invention.

Figure 6:
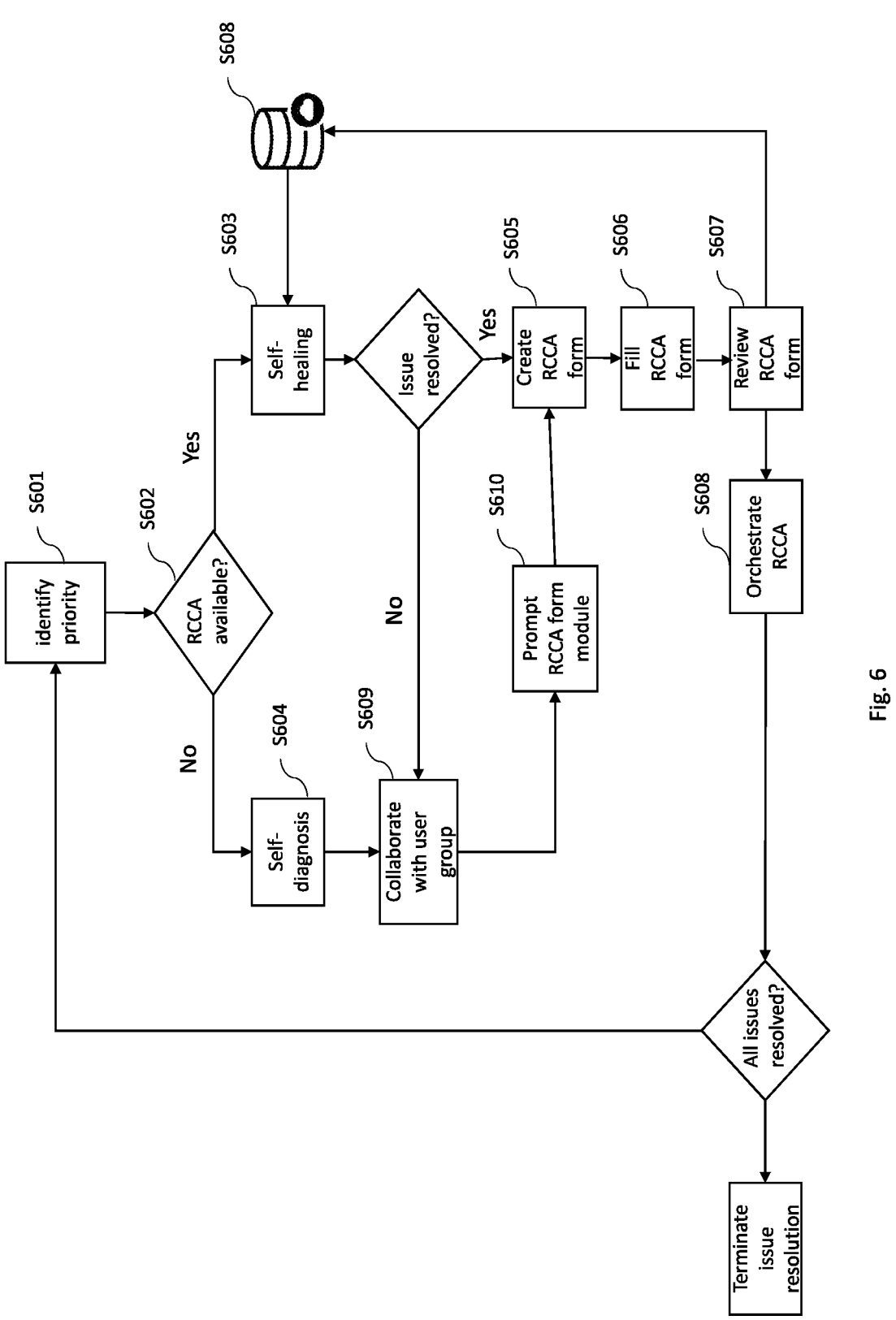

FIG. 6 illustrates a method for diagnosis of root cause, identification of root cause corrective actions and determine quality score of corrective actions based on RCCA form, in accordance with an embodiment of the present invention.

DETAILED DESCRIPTION OF THE INVENTION

The detailed description set forth below in connection with the appended drawings is intended as a description of various embodiments of the present invention and is not intended to represent the only embodiments in which the present invention may be practiced. Each embodiment described in this invention is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations The present disclosure relates to a system and method for performing root cause analysis and taking corrective actions for such root cause. The system automates the performance of root cause analysis and corrective actions, and the method performed by the system is aimed at rectifying issues or incidents arising in a service or application. The root causes of the issue, error, problem and/or incident faced by the user of a service or an application is resolved by the system by identifying the root causes of the issues and rectifying the root causes. The root causes are rectified using one or more corrective actions corresponding to each root cause. In many instances, a plurality of issues may arise in a one or more services or applications provided by a service provider within a specific period of time, and rectification of all issues simultaneously may be difficult. Hence, the system automates the rectification of one or more issues using corrective actions based on the priority level of the issues with respect to the service or application, so as to ensure that most relevant or serious issues are handled in a timely manner.

FIG. 1 illustrates an exemplary network architecture of the system for performance of root cause analysis and identifying root cause corrective action to resolve issues in an asset, in accordance with an embodiment of the present invention. The asset may be a service, application, product, or device provided as a service to one or more users. Such assets may require continuous maintenance and resolution of issues for optimal performance, and the system 100 may be used by individuals for the resolution of issues arising in the asset. The individuals that use the system 100 for resolution of issues of an asset may include the stakeholders of the asset or individuals who provide the asset as a service to the users. The system 100 comprises a plurality of user devices 102-1 to 102-n (collectively labelled 102). The user devices 102 are used for interacting with users of the asset, and for receiving requests for issue resolution or feedback on the performance of the system 100 with respect to resolving of issues.

The user devices 102 are connected to an application server 106 via a network. In an embodiment, the system 100 provides an application server interface 104 to provide interface to the user devices 102 with application server 106. In some embodiments, the network may be a public network (e.g., the Internet), a private network (e.g., an internal localized, or closed-off network between particular devices). In some other embodiments, the network may be a hybrid network (e.g., a network enabling internal communications between particular connected devices and external communications with other devices). In various embodiments, the network 102 may include one or more relay(s), router(s), switch(es), routing station(s), and/or the like.

The network is used to connect the user devices 102 to the application server 106. The application server 106 is a cloud-based server created for an asset, and is used for resolving issues arising in the asset. The application server 106 is coupled to the application server interface 104 which acts as interface for the communication of users and the system 100 for resolving the issues. Data and performance related metrics of the asset are accessed by the application server, and monitoring of such data may be performed by the application server for detecting issues in an asset. When an issue is detected in an asset, the corresponding application server performs a set of operations for resolving the issue. In certain embodiments, the application server may perform the set of operations for resolving issues in the asset based on a request provided by users from the user devices 102.

The performance of the set of operations by the application server for resolving issues is based on the execution of program instructions corresponding to such operations by application server 106. The application server 106 may be a computing device, server or any processing device capable of performing program instructions corresponding to the root cause analysis of an issue and corrective action execution for root causes of the issue. The program instructions may be stored in the application server 106, or may be accessed from a database 108. The database 108 is used to store different types of information relating to resolution of issues for an asset. The information stored in the database 108 may be accessed by the application server at any instance for performing resolution of issues. In some embodiments, the database may be comprised within the application server 106.

FIG. 2 illustrates an exemplary system for performing root cause and identifying root cause corrective action, in accordance with an embodiment of the present invention. In an embodiment, one or more user devices 202 of the system 200 are operatively connected to an RCCA (Root Cause Corrective Action) module 204 via the application server interface 206. In an embodiment, the RCCA module 204 may be implemented by operation of the application server, and is used to perform root cause analysis and corrective action automation to resolve one or more issues faced in an asset by users of the asset.

The RCCA module 204 identifies one or more root causes of the issues in the asset, and performs root cause corrective actions for rectifying the root causes of the issues. In one embodiment, the root cause corrective actions are retrieved by the RCCA module 204 from the database 208. In other embodiments, the root cause corrective actions for a root cause of an issue may be diagnosed and determined by the RCCA module 204 and the root cause corrective actions thereby determined may be stored in the database 208 for future reference.

In an exemplary embodiment, the RCCA module 204 comprises a priority identification module 210 which is configured to identify one or more failures/issues/incidents with execution of one or more applications/services at the user's end. Based on access and service level agreement with the user, one or more applications/services may have different sub-applications/services having different priority level. The application server may assign different priority levels to one or more applications, such as the priority identification module 210 is configured to identify the priority level with applications/services which are affected during execution. In an example, identification and rectification of an affected application/service with high priority is very critical to meet the service level agreement with the user than a low priority application or service.

In an embodiment, the priority identification module 210 is configured to determine priority level of the applications/services which are affected during execution. The identification of issues may be based on monitoring of performance of different aspects or different performance metrics of the asset. The aspects, metrics and/or variables of the asset analyzed for monitoring of the performance of the asset may depend on the nature of services or functionalities provided by the asset. The monitoring of performance of different aspects of the asset may be performed by a processing unit of the server. In an embodiment, the monitoring may be performed by a separate and dedicated processing unit.

The monitoring of performance for identification of issues may be performed continuously in the priority identification module 210 or may be prompted by user requests provided from one or more of the user devices 202. Such user requests may be provided by a user of the asset based on a perceived difference in performance of the asset, or based on an obvious and apparent issue in the asset. The user requests may be provided as a flag, an alert, or a request for assistance. Based on the user request, monitoring of performance of the asset, different performance metrics, and different functionalities of the asset may be performed for identifying issues arising in the asset. In certain implementation, user request may also include detailed responses on the functionalities of the asset visibly impacted by issues, and such additional information may be used to assist the monitoring of the asset for identifying the corresponding issues.

In certain embodiments, the priority identification module 210 may perform identification of issues by generating queries which are provided to the users of the asset through user devices 202 via the network 206. The queries are provided to the user to retrieve user responses relating to the issues in the asset, and the user responses convey the different issues present in the asset. Such an operation of the priority identification module 210 may be implemented in instances where the issues in the asset are evident and identifiable to a user, and may be directly retrieved by the user instead of performing identification based on monitoring of performance of the asset.

The one or more issues in the asset, identified by the priority identification module 210, are thereafter processed by the priority identification module 210 to determine the priority level of each of the issues. A plurality of issues of different types may arise in an asset, and each issue may have a different priority, where the priority of an issue reflects the urgency of resolution of the issue or significance of the issue with respect to the performance and functionality of the asset. The urgency of the issue may be based on the user affected by the issue, and the terms of the Service Level Agreement (SLA) entered into by the user and the stakeholders of the asset or individual providing the asset to the user. The urgency of resolution may also be influenced by the nature of the issue, and possible consequences of a delayed resolution of the issue to the asset and users of the asset.

The priority level of an issue is thus determined by the priority identification module 210 based on the SLA and other associated factors, and the determination of priority levels may be assisted by predefined guidelines or rules. The guidelines or rules may be formulated based on inputs or directions of the stakeholders of the asset or individual who provide the asset as a service to the users, and such directions may be based on terms of the SLA entered into with the different users. Hence, the priority identification module 210 of the RCCA module 204 is configured to identify one or more issues in the asset, and the associated priority levels of the issues.

The RCCA module 204 further comprises a runbook module 212 and a database module 208. The priority identification module 210 is operationally coupled to runbook module 212. The priority identification module 210, in addition to the identification of issues and its priority levels, also identifies one or more root causes associated with an issue, based on assistance provided by the runbook module 212.

The issues identified by the priority identification module 210 and the priority levels determined for each of the issues are provided to the runbook module 212 in the order of priority of the issues, i.e., the information relating to the issues with highest priority level are communicated first to the runbook module 212. The runbook module 212 is primarily used for accessing runbooks stored in the database module 208 containing information relating to corrective actions for rectifying the root causes of the issue with highest priority level. Each issue may have one or more root causes, and each root cause may have one or more corrective actions which already exist in the database 208. The corrective actions may be stored in the database 208 based on previous operations of the system 200, or based on corrective actions determined by the stakeholders of the asset for root causes commonly faced in such an asset. Each existing corrective action is stored in a runbook within the database 208, and the runbook module 212 is used to access a runbook corresponding to a corrective action for the root cause of an issue.

The runbook module 212 receives the root causes corresponding to an issue with highest level of priority from the priority identification module 210, and retrieves one or more corrective actions corresponding to each of the root causes from the database 208, wherein each corrective action is stored in a runbook. A runbook, in the context of the present invention, is a comprehensive and detailed guide of corrective action that is to be performed for rectifying a root cause of an issue. The runbook may contain detailed step by step instructions of the tasks to be performed relating to the corrective action. The steps listed in the runbook corresponding to a corrective action is performed by a processing unit of the server. In certain embodiments, some or all of the steps involved in a corrective action may require user intervention, wherein the users of the asset may be required to execute the steps.

The runbooks containing corrective actions already existing in the database 208 are obtained as a result of prior operations of the RCCA module wherein such corrective actions were determined, or are obtained as a result of corrective actions provided by the stakeholders based on commonly occurring root causes. Such corrective actions are stored in the database 208 for easy and quick access by the priority identification module 210. A corrective action recorded in a runbook stored in the database 208 may correspond to a root cause, wherein the root cause may occur for the same issue, similar issue, or in certain instances for a different issue.

The runbook module 212 is thus used for identifying the corrective action for root causes of the issues communicated by the priority identification module 210 and providing runbook containing the corrective actions for rectifying the root causes identified. The runbook module 212 hence acts as a guide or directory for accessing corrective actions. In some embodiments, the runbook module 212 may access runbooks corresponding to one or more root causes, wherein the runbooks recording the detailed description of steps to be executed as a corrective action is stored in a memory external to the runbook module 212. Such memory may also be hosted in a server or database external to the system 200, and may be accessed by the runbook module 212 on receiving a request for retrieving corrective actions for a root cause of an issue.

The RCCA module further comprises a self-healing module 214 which is operationally coupled to said priority identification module 210 and the runbook module 212. The corrective actions recorded in the one or more runbooks retrieved from the database 208 by the runbook module 212 is provided to the priority identification module 210. The priority identification module 210 provides the corrective actions recorded in runbooks retrieved by the runbook module 212 to the self-healing module 214, and the self-healing module 214 is used for executing the steps of the corrective action to resolve the issues.

In an embodiment, the priority identification module 210 may have one or more identified issues relating to one or more users of the asset to be resolved, and the issues are thus provided to the self-healing module 214 in order of their priority. The operation of the self-healing module 214 is based on information relating to an issue, wherein the information relating to an issue includes the priority level of the issue, the one or more root causes identified for the issue, and the corrective actions retrieved by the runbook module 212 for rectifying the root causes.

Thus, the corrective actions retrieved by the runbook module 212 are used by the self-healing module 214 for performing resolution of an issue. The operation of the self-healing module 214 in executing the corrective actions may be performed using a processor of the application server. In certain embodiments, the execution of the corrective actions for the different issues may also be performed by a processing unit or processor dedicated to performing operations relating to the self-healing module 214. The self-healing module may receive multiple issues to be resolved at one instance, and execution of the issues in such situations are based on the priority of the issues to be resolved. In certain embodiments, execution of a corrective action for a particular issue of the asset may be halted by the self-healing module 214 to execute a corrective action for an issue of a higher priority. In such circumstances, the execution of the halted corrective action may only be resumed after resolution of the issue due to which its execution was paused.

In some instances, there may be one or more corrective actions retrieved by the runbook module 212 for resolving a single issue. In such instances, the self-healing module 214 may prioritize the order in which the corrective actions are executed in order to achieve quickest resolution of the associated issue. The priority assigned to execution of different corrective actions associated with an issue may be based on a quality score associated with the corrective action. The quality score of a corrective action indicates the effectiveness of the corrective action to resolve the root cause for which it is executed. The quality score may be based on several factors including the time taken to resolve the root cause, the probability of success of resolving the root cause based on execution of the corrective action, the processing support required for executing the corrective action, and the level of user intervention required for performing the corrective action.

The RCCA module 204 further comprises a self-diagnostic module 216 which is operationally coupled to priority identification module 210. The self-diagnostic module 216 further comprises a communication platform 218. The operations of the RCCA module 204, on failure of corrective actions performed by self-healing module 214, includes forwarding of the one or more of the remaining unrectified root causes of the issue identified by the priority identification module 210 to the self-diagnostic module 216. The self-diagnostic module 216 enables the diagnosis of the one or more root causes, and provides additional corrective actions based on the diagnosis for each of the remaining root causes, which may be performed to rectify such root causes.

In an embodiment, the diagnosis of the one or more root causes for determining additional corrective actions involves one or more stakeholders who determines corrective actions relating to the identified issue. The collaboration between one or more stakeholders is achieved using the communication platform 218. The stakeholders who are collaborating over communication platform 218 to identify and generate new corrective actions may include technical members, individuals associated with providing the asset as a service to the users, and developers of the technological infrastructure of the asset. Over the communication platform 218, insights from one or more of such individuals may be required to perform a detailed diagnosis of the one or more unresolved root causes of the issues to identify or generate additional corrective actions.

The communication platform 218 creates a platform or interface for setting up meetings to enable collaboration of different skilled individuals for developing new corrective actions for each of the remaining root causes. A corrective action determined by the user group as a result of one or more collaboration meetings may be executed by the self-diagnostic module 216. In an embodiment, collaboration solutions or products may be developed by the communication platform 218 for enabling collaboration of different skilled individuals. In another embodiment, collaboration solutions or products developed by a third party may be used by the communication platform 218.

In an embodiment, when the priority identification module 210 forwards the issue to the self-diagnostic module 216, the self-diagnostic module 216 is configured to automatically enable setting up the communication platform 218. The communication platform 218 based on information received from self-diagnostic module 216 sends invite or connect one or more stakeholders who will be involved in determining a root cause corrective actions (RCCA) in collaboration with each other.

The operation of the self-diagnostic module 216 performed for enabling the communication and collaboration of individuals of the user group over the communication platform 218 includes scheduling and opening of meeting invites with technical teams, key stakeholders, incident managers, and other individuals involved in the development and maintenance of the technological architecture of the asset, and members of the user group. The scheduling of such meetings may be performed as an automated process by the self-diagnostic module 216 based on availability of the above-mentioned individuals, and priority of the one or more root causes to be resolved. The priority of the one or more persisting root causes may be derived from the priority of the issue in which the root causes arose, and the impact of the persisting root causes in the performance of the asset.

One or more meetings additional meetings may be automatically scheduled by the self-diagnostic module 216 depending on the success or failure of the prior collaboration meetings in generating new corrective actions. Additional meetings may also be scheduled depending on the effectiveness of the newly generated corrective actions in rectifying a root cause.

If a corrective action determined by the user group based on collaboration meetings conducted using the communication platform 218 is effective in rectifying a root cause, output of implementation of such a corrective action is provided to the users by the status update module 222. If the user is not satisfied with the resolution, a corresponding input is provided using the user device 202 to the self-diagnostic module 216, which thereafter executes the next corrective action determined by the user group corresponding to a root cause.

In yet another embodiment, the present disclosure provides generating a root cause corrective action (RCCA) form by a RCCA form module 204 for collaboration with the user and stakeholders in identifying the root cause and also, determine the quality score of the corrective action being applied by the RCCA module 204. The RCCA module 204 is operatively coupled to a RCCA form module 220 and the RCCA form module 220 is coupled to the database module 208.

If one or more corrective actions have been formulated corresponding to a root cause, the corrective action with the best quality score is executed by the self-diagnostic module 216. If the corrective action is ineffective in rectifying the root cause, the quality score of the corrective action is updated to reflect such ineffectiveness. Further, the corrective action with the next best quality score is implemented using the self-diagnostic module 216. Such an iterative cycle continues till the root cause is rectified or the corrective actions determined by the user group are exhausted. If the corrective actions determined by the user group are exhausted, additional collaboration meeting are scheduled and conducted using the communication platform 218 to identify additional corrective actions.

In certain embodiments, an external unit may be used for identifying or generating new corrective actions, and the external unit may be an intelligence engine based on ML (Machine Learning) techniques. Such intelligence engines may be used for analysis of a root causes, and performing various computations or processing of available data obtained from the system 200 and the users to arrive at possible corrective actions for each of the root causes. The software or program used in the communication platform 216 may be developed or selected based on the ability to support the functioning of ML techniques.

In a further embodiment, the RCCA module 204 further comprises a status update module 222 which provides an update to one to more user on the successful rectification of identified root cause.

In an implementation, when the priority identification module 210 identifies an issue with the implementation of one or more applications/services, the RCCA form module 220 is prompted to creates a RCCA form and said RCCA form may be accessible to stakeholders involved in identification of root cause corrective action and user accessing the application. In an alternative implementation, the user may prompt the RCCA form module 220 to create a RCCA form by providing a request for resolution of an issue to the RCCA module 204.

In an exemplary embodiment, the RCCA form created by the RCCA form module 220 is used to obtain user feedback on the effectiveness of a corrective action in rectifying a root cause. The RCCA form may be used to store parameters relating to the root cause for which the corrective action was implemented, the issue in which such root cause arose, and the level of user's satisfaction with respect to the result. In some embodiments, the RCCA form may also contain an indication of the level of effectiveness achieved by the corrective action, wherein the levels include complete success, partial success, or complete failure, or quantitative values corresponding to the degree of success.

The RCCA forms created corresponding to the user feedback of execution of corrective actions, if any, will be stored to the database 208 for future reference. The RCCA forms are stored to the database 208 may be accessed along with the corresponding corrective action in future operations of the RCCA module 204, wherein the information stored in the RCCA form of a corrective action may be used to decide the corrective action to be implemented to rectify a particular root cause. One or more RCCA forms may be created for to a single corrective action corresponding to the multiple implementations of the corrective action over multiple executions of the RCCA module 204.

In one embodiment, the RCCA form created corresponding to an issue may be resolved when a corrective action has been implemented successfully for a root cause of the issue. The RCCA forms is closed after obtaining user feedback on the effectiveness of the corrective action implemented. If the issue is not completely resolved after rectification of a root cause by the corrective action, a new RCCA form is generated for the issue that persists.

FIG. 3 illustrates a more detailed embodiment of RCCA form module according to the present disclosure. The RCCA form module 302 may comprises one or more modules such as an RCCA form creation module 304, an RCCA autofill module 306, an RCCA identification module 308, an RCCA orchestration module 310. As illustrated, when an issue with implementation of an application/service along with its priority level is identified, a RCCA form is created by RCCA form module.

In an embodiment, one or more stakeholders 312 who are involved in determining a corrective action and the user collaborates with each other through the RCCA form. The RCCA form creation module 304 is configured to generate a RCCA form based on upon the determination that one or more services/applications have been affected. The RCCA form may be presented to the user and stakeholders through an interface.

The RCCA autofill module 306 is configured to autofill the generated RCCA form based on applications/services impacted, root cause. In an implementation and as illustrated, one or more stakeholders interact with each to determine root cause corrective action through the communication platform. The RCCA autofill module 306 auto-fills the details regarding the root cause, details of the applications/services being impacted and different root cause corrective action being proposed by the stakeholders over the communication platform. In an implementation, the RCCA autofill module 306 is configured to access the transcripts of the messages exchanged over the communication platform and autofill one or more details regarding the root cause, root cause corrective actions in the RCCA form. Further, the user has access to RCCA form to submit feedback. The feedback may include specific issues faced by the user during implementation of effected application, resolution status of the root cause, effectiveness of root cause corrective action being proposed.

In an embodiment, the auto-fill operation performed by the RCCA autofill module 306 is based on a large language data model such as LLaMA (Large Language Model Meta AI), which is used to recursively produce text by predicting a next word by taking a sequence of words as input. The sequence of words used by the LLaMA model may be information relating to the issue, or may be transcripts of the messages exchanged over the communication platform.

The RCCA identification module 308 is configured to list one or more root cause corrective actions being proposed by the stakeholders. In an implementation, the RCCA identification module 308 accesses the transcripts of one or more root cause corrective action implemented by the stakeholders and are saved in the RCCA identification module 308. Further, the metrics associated with root cause corrective action are saved and said metric may indicate the measure of success in resolving the root cause.

The RCCA orchestration module 310 is configured to build metric from corrective action-related metadata to help prioritize the identified issue/problem based on the service level agreement relating to the associated service or application affected by the issue. The quality score of a corrective action is provided by the stakeholders or individuals involved in the determination of a corrective action for a root cause. Such determination of corrective action may have been performed by such individuals based on identification of root causes for commonly occurring issues in the asset, or in instance where existing corrective actions are insufficient for rectifying root causes of an issue. The quality score provided by such individuals may be updated over multiple executions of the RCCA module, wherein the effectiveness of the corrective action for each instance of its application is reflected in its quality score. In one embodiment, the quality score of a corrective action may be stored in the runbook along with the corrective action. In another embodiment, the quality score of the corrective action may be stored in the same memory as the runbook, and may be connected by some index or pointer.

In an implementation, the RCCA form module 302 is configured to update the RCCA form based on status of resolution of identified root cause. Based on the determination that the root cause has been rectified and the user has submitted the feedback on closure of the identified issue, the RCCA form is saved in the database. In an embodiment, the RCCA form generated corresponding to the user feedback is also stored in the database, and may be accessed along with the runbook containing the corrective action in future operations of the RCCA module. In one embodiment, RCCA forms may also be created for the corrective actions rejected by the users, and such RCCA forms may also be stored in the database 316 for future reference.

After rectification of all root causes in an issue, resolution of the issue with the next highest level of priority may be initiated by the RCCA module. In certain embodiments, the rectification of root cause may be halted when the system is faced with an issue of a higher priority level which requires an immediate intervention and resolution by the RCCA module. In other embodiments, the resolution of an issue may be halted if the priority of the issue has decreased after the partial resolution of the issue based on the execution of the self-healing and/or self-diagnostic module. After the resolution of the issues in the asset, the status update module may be used to confirm with the user if the execution of the RCCA module is to be terminated. If all issues are not resolved, the RCCA module initiates its operation for the next issue based on priority level of the issue.

The RCCA module is coupled to the database 316 and one or more information determined by various modules such as an RCCA autofill module 306, an RCCA identification module 308, an RCCA orchestration module 310 are saved in the database. In an embodiment, one or more information associated with RCCA module may include issues relating to impacted application, root cause of the issue, one or more root cause corrective actions implemented to resolve the root cause and the metric indicating the quality score of the root cause corrective action.

The RCCA form that was created based on occurrence of a new issue in the asset is closed only after complete resolution of the issue by the RCCA module. The RCCA form is closed after a confirmation is received from the user that the issue has been resolved to the satisfaction of the user. Periodic remainders may be provided to the stakeholders of the asset regarding need for resolution of an issue, and the remainders will be provided until a confirmation of issue resolution has been received from the client. The RCCA form module generated for each issue by the RCCA form module 302 may also be used to provide update to the user regarding the status of resolution of the issue. For instance, an issue resolution pending status may be provided to the users in the duration wherein the RCCA form is open.

FIG. 4 illustrates an exemplary embodiment for self-healing of root cause and creation of RCCA form. In an embodiment, the priority identification module 400 is configured to identify one or more failures/issues/incidents with execution of one or more applications/services at the user's end. Based on access and service level agreement with the user, one or more applications/services may have different sub-applications/services having different priority level. The application server may assign different priority levels to one or more applications, such as the priority identification module 400 is configured to identify the priority level with applications/services which are affected during execution.

The runbook module 402 receives the root causes corresponding to an issue with highest level of priority from the priority identification module 400, and retrieves one or more corrective actions corresponding to each of the root causes from the database 416, wherein each corrective action is stored in a runbook. The runbook module 402 provides the identified root cause corrective action and provides the same to the priority identification module for further processing. The priority identification module 400 is coupled to the self-healing module 404 and forwards the identified root cause corrective action to the self-healing module 404 for troubleshooting.

The self-healing module 404 is configured to perform troubleshooting based on one or more root cause corrective action retrieved from the runbook. In one embodiment, when the troubleshooting is successful and the root cause corrective action is successfully implemented, an indication is provided to the priority identification module.

In an aspect, upon determination of one or more failures/issues/incidents with execution of one or more applications/services at the user's end, the RCCA form module 406 is configured to create a RCCA form. The RCCA form module 406 is coupled to the self-healing module 404. The RCCA form module 406 may comprises one or more modules such as an RCCA form creation module 408, an RCCA autofill module 410, an RCCA identification module 412, an RCCA orchestration module 414.

In an embodiment, the RCCA autofill module 410 is configured to autofill the generated RCCA form based on applications/services impacted and the root cause. The RCCA autofill module 410 auto-fills the details regarding the root cause, details of the applications/services being impacted and different root cause corrective action being implemented by the self-healing module 404. Further, the user has access to RCCA form to submit feedback. The feedback may include specific issues faced by the user during implementation of effected application, resolution status of the root cause, effectiveness of root cause corrective action being proposed. In a further embodiment, the RCCA identification module 412 is configured to list one or more root cause corrective actions being implemented by the self-healing module 404. Further, the metrics associated with root cause corrective action are saved and said metric may indicate the measure of success in resolving the root cause. The RCCA orchestration module 414 is configured to build metric from corrective action-related metadata to help prioritize the identified issue/problem based on the service level agreement relating to the associated service or application affected by the issue.

In an implementation, the RCCA form module 406 is configured to update and save the RCCA form at the database 416. In this way, the database 416 is updated with the information on service level application which was affected, root cause corrective action which was implemented along with its quality score, such that the corrective action may be implemented for similar instances.

In an embodiment, the self-healing module 404 may implement one or more root cause corrective action based on runbook module and determines the quality score of the one or more root cause corrective actions based on RCCA form. The RCCA orchestration module 414 is configured to determine metrics on quality score of one or more root cause corrective actions identified in RCCA identification module 412 and save the metrics on quality score in the database 416. The self-healing module 404, based on priority level of affected applications/services and quality score of corrective actions stored in the database 416, may implement one or more root cause corrective actions for an identified root cause.

FIG. 5 illustrates an exemplary embodiment for self-diagnosis of root cause, identification of root cause corrective actions and determine quality score of corrective actions based on RCCA form.

In an illustrative embodiment, the priority identification module 500 upon receiving indication from the self-healing module that the root cause corrective action is not available based on run book, the priority identification module 500 is coupled to the self-diagnostic module 502 for identification of root cause corrective action and rectification of root cause. In an embodiment and as illustrated, the diagnosis of the one or more root causes for determining additional corrective actions involves one or more stakeholders who determines corrective actions relating to the identified issue.

The collaboration between one or more stakeholders is achieved using the communication platform 504. The stakeholders who are collaborating over communication platform 504 to identify and generate new corrective actions may include technical members, individuals associated with providing the asset as a service to the users, and developers of the technological infrastructure of the asset. Over the communication platform 504, insights from one or more of such individuals may be required to perform a detailed diagnosis of the one or more unresolved root causes of the issues to identify or generate additional corrective actions. The communication platform 504 creates a platform for meetings to enable collaboration of different skilled individuals for developing new corrective actions for each of the remaining root causes. A corrective action determined by the user group as a result of one or more collaboration meetings may be executed by the self-diagnostic module 502.

The self-diagnostic module 502 is configured to perform troubleshooting based on additional one or more root cause corrective actions. In one embodiment, when the troubleshooting is successful and the root cause corrective action is successfully implemented, an indication is provided to the priority identification module.

In an aspect, upon determination of one or more failures/issues/incidents with execution of one or more applications/services at the user's end, the RCCA form module 506 is configured to create a RCCA form. The RCCA form module 506 is coupled to the communication platform of the self-diagnostic module. The RCCA form module 506 may comprises one or more modules such as an RCCA form creation module 508, an RCCA autofill module 510, an RCCA identification module 512, an RCCA orchestration module 514. As illustrated, when an issue with implementation of an application/service along with its priority level is identified, a RCCA form is created by RCCA form module.

In an embodiment, one or more stakeholders who are involved in determining a corrective action and the user collaborates with each other through the RCCA form. The RCCA form creation module 508 is configured to generate a RCCA form based on upon the determination that one or more services/applications have been affected. The RCCA form may be presented to the user and stakeholders through an interface.

The RCCA autofill module 510 is configured to autofill the generated RCCA form based on applications/services impacted, root cause. In an implementation and as illustrated, one or more stakeholders interact with each to determine root cause corrective action through the communication platform. The RCCA autofill module 510 auto-fills the details regarding the root cause, details of the applications/services being impacted and different root cause corrective action being proposed by the stakeholders over the communication platform 504. In an implementation, the RCCA autofill module 510 is configured to access the transcripts of the messages exchanged over the communication platform 504 and autofill one or more details regarding the root cause, root cause corrective actions in the RCCA form. Further, the user has access to RCCA form to submit feedback. The feedback may include specific issues faced by the user during implementation of effected application, resolution status of the root cause, effectiveness of root cause corrective action being proposed.

The RCCA identification module 512 is configured to list one or more root cause corrective actions being proposed by the stakeholders. In an implementation, the RCCA identification module 512 accesses the transcripts of one or more root cause corrective action implemented by the stakeholders and are saved in the RCCA identification module. Further, the metrics associated with root cause corrective action are saved and said metric may indicate the measure of success in resolving the root cause. The RCCA orchestration module 514 is configured to build metric from corrective action-related metadata to help prioritize the identified issue/problem based on the service level agreement relating to the associated service or application affected by the issue.

The RCCA form module 506 is configured to update the RCCA form based on status of resolution of identified root cause. Based on the determination that the root cause has been rectified and the user has submitted the feedback on closure of the identified issue, the RCCA form is saved in the database.

The RCCA form module 506 is coupled to the database 516 and one or more information determined by various modules such as an RCCA autofill module 510, an RCCA identification module 512, an RCCA orchestration module 514 are saved in the database 516. In an embodiment, one or more information associated with RCCA form module 506 may include issues relating to impacted application, root cause of the issue, one or more root cause corrective actions implemented to resolve the root cause and the metric indicating the quality score of the root cause corrective action.

In an embodiment, the RCCA form generated corresponding to the user feedback is also stored in the database 516, and may be accessed along with the runbook 518 containing the corrective action in future operations of the RCCA module. In one embodiment, RCCA forms may also be created for the corrective actions rejected by the users, and such RCCA forms may also be stored in the database for future reference.

FIG. 6 illustrates a method for resolving issues in an asset, in accordance with an embodiment of the present invention. The first step S601 involves the identification of the issues, and priority of the different issues faced by the asset using the priority identification module of the system. The subsequent steps of the method are performed for issues in the based on the priority of issues identified by the priority identification module. At step S602, the method involves checking if corrective actions are available for the one or more root causes of the issue with highest priority. The identification of root causes of the issue is performed by the priority identification module with the assistance of the runbook module, and the runbook module is further used to identify the various corrective actions for rectifying the root causes of the issue. The runbook module identifies the various corrective actions for rectifying the root causes from the information relating to corrective actions performed by the previous operations of the system from the database, wherein such information is contained in runbooks stored in the database. Further, Step S602 determines whether the runbook module is successful in retrieving any appropriate corrective actions from the database for resolving the issue.

If one or more corrective actions are available, the corrective actions with highest quality scores are used to resolve the issue at step S603. The step S603 involves the execution of the self-healing module, wherein the retrieved corrective actions are executed for rectifying the root causes of the issue. If no corrective actions are available, the self-diagnostic module is executed at step S604 for the identification of additional corrective actions. Step S604 also includes the creation of the communication platform for enabling collaboration between members or individuals of the user group for identifying the different corrective actions which may be used for rectifying the root causes of the issue.

In Step S605, a RCCA form is created by the RCCA module which is configured to be auto-filled based on identified issue, root cause, and corrective actions performed by the RCCA module. In Step S603, if the issue is resolved based on the execution of the self-healing module, the effectiveness of the corrective actions executed therein are captured based on the feedback provided by the user by means of the RCCA form. The RCCA forms corresponding to feedback of user to the execution of corrective actions performed by the self-healing module are opened at step S605, and the data relating to the issue, root cause, corrective action implemented, and the user feedback received are filled at step S606. The information in the RCCA forms may be reviewed at step S607 and the quality score of the corrective actions are updated in the database after review of the information listed in the RCCA form. The orchestration of the RCCA may be performed using the RCCA form orchestration module at step S608, and the orchestration step includes determining of priority of the issues of the asset. The RCCA orchestration module builds metric from corrective action-related metadata to help prioritize the identified issue/problem based on the service level agreement relating to the associated service or application affected by the issue and determine the quality score of the root cause corrective actions implemented by the RCCA module. If all the issues faced by the asset are not resolved, the remaining issues may be resolved based on the priority of the issues by repetition of the method from step S601.

If the issues are not resolved based on the execution of the self-healing module at step S603, the issues may thereafter be communicated to the self-healing module, and collaborations between the individuals of the user group may be carried out using the communication platform for identifying new corrective actions at step S604. Hence step S604 may be used for identifying corrective actions in scenarios where either the requisite corrective actions are not accessible by the runbook module, or where the corrective actions retrieved by the runbook module from the database 608 are insufficient to resolve the issue. In step S610, the self-diagnostic module automatically prompt the RCCA form module to open and create a RCCA form for collaboration by user accessing the application and stakeholders who are involved identifying the additional root cause corrective actions.

In Step S605, based on prompt in S610, a new RCCA form is opened and created for entering information related to the issue, root cause of the issue, the one or more corrective actions identified for a particular issue, and to capture the transcripts of collaboration meetings conducted to determine the RCCA actions. The RCCA form is created using the RCCA form creation module.

In Step S606, the RCCA form is auto-filled with one or more information relating to the identified issue, root cause, transcripts of communication platform, the new corrective actions identified. The corrective actions entered into the new RCCA form and information relating to the one or more corrective actions are reviewed at step S607 based on the feedback provided by the users regarding resolution of issue by execution of corrective actions. The reviews made to the RCCA form at step S607 includes changes to the quality score of a corrective action based on the effectiveness of the RCC action.

After the RCCA forms are reviewed at step S607, the RCCA forms with updated values of quality scores may be saved in the database 608. These forms may be accessed by the runbook module during further executions of the system for resolving issues in the asset.

The RCCA orchestration module may be executed at step S608 for determining the priority of the different issues including issues yet to be resolved. The RCCA orchestration module is configured to build metric from corrective action-related metadata to help prioritize the identified issue/problem based on the service level agreement relating to the associated service or application affected by the issue. The RCCA orchestration module may also be used to identify the priority of the current issue if the issue has been partially resolved, and would require further execution of the method to be completely resolved. The RCCA orchestration module may also be used to update the priority level of the issue if the priority level determined by the priority identification module at step S601 was incorrect.

If all the issues are resolved at step S610, the system may terminate its execution for resolving the issues. The system may however continue to monitor the performance of the asset for issues, and may perform the method as illustrated in FIG. 6 till all issues are resolved. If all the issues are not resolved at step S610, the system may continue the execution of the method from step S601 for the remaining issues based on the priority level of the remaining issues.

The system and method proposed in the present invention may thereby be used for the resolution of errors or issues arising within assets such as a service, application, or product provided to a plurality of users as a service. The resolution of issues in a timely and efficient manner is essential is assets based on complex technological architecture, as issues relating to on aspect or component of the asset may lead to subsequent failure of related or connected aspects of the asset. The method proposed by the present invention further ensures that the resolution of the issues is automated to provide minimum interference or intervention of users, and also ensures that issues having a high priority level may be resolved with immediate execution of the system. The creation of RCCA forms documenting the actions adopted to resolve one or more root causes identified for a particular issue ensures that subsequent occurrences of the same or similar issues may be resolved swiftly without the need to generate new set of RCC actions.

The figures of the disclosure are provided to illustrate some examples of the invention described. The figures are not to limit the scope of the depicted embodiments or the appended claims. Aspects of the disclosure are described herein with reference to the invention to example embodiments for illustration. It should be understood that specific details, relationships, and method are set forth to provide a full understanding of the example embodiments. One of ordinary skill in the art recognize the example embodiments can be practiced without one or more specific details and/or with other methods.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Aspects of the present disclosure may be implemented as computer program products that comprise articles of manufacture. Such computer program products may include one or more software components including, for example, applications, software objects, methods, data structure, and/or the like. In some embodiments, a software component may be stored on one or more non-transitory computer-readable media, which computer program product may comprise the computer-readable media with software component, comprising computer executable instructions, included thereon. The various control and operational systems described herein may incorporate one or more of such computer program products and/or software components for causing the various conveyors and components thereof to operate in accordance with the functionalities described herein.

A software component may be coded in any of a variety of programming languages. An illustrative programming language may be a lower-level programming language such as an assembly language associated with a particular hardware architecture and/or operating system platform/system. Other example of programming languages included, but are not limited to, a macro language, a shell or command language, a job control language, a script language, a database query, or search language, and/or report writing language. In one or more example embodiments, a software component comprising instructions in one of the foregoing examples of programming languages may be executed directly by an operating system or other software component without having to be first transformed into another form. A software component may be stored as a file or other data storage methods. Software components of a similar type or functionally related may be stored together such as, for example, in a particular directory, folder, or repository. Software components may be static (e.g., pre-established, or fixed) or dynamic (e.g., created or modified at the time of execution).

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

We claim:

1. A system for performing root cause analysis, comprising:
a processor;
a memory storing program instructions which, when executed by the processor, causes the processor to:
identify at least one problem associated with running an application by at least one user, wherein identifying the at least one problem includes determining a priority level of one or more services being impacted based on a service level agreement;
identify at least one root cause associated with the at least one problem;
access a runbook to identify one or more root cause corrective actions (RCCA) associated with the at least one root cause;
implement at least one RCCA for troubleshooting the identified at least one problem;
generate a RCCA form for use by a user group for identifying and validating an additional RCCA;
determine a quality score of the RCCA for the additional RCCA;
update a database to include the additional RCCA based on the quality score; and
automatically initiate self-diagnosis to derive at least one additional corrective action when the RCCA is not available in the runbook for the at least one root cause, wherein during the self-diagnosis the processor is further configured to:
create a new RCCA form;
auto-fill the new RCCA form at least based on a transcript of collaboration meetings and messages regarding the at least one root cause, the RCCA exchanged over a communication platform; and
identify one or more RCCA different from the at least one RCCA for the identified at least one problem based on the transcript.

2. The system of claim 1, wherein the processor is configured to:
implement the RCCA for the root cause, based on identifying a procedure from the runbook;
wherein when the RCCA fails to rectify the root cause, the processor is further configured to:
identify one or more parameters associated with the application and the identified at least one problem;
automatically set up the communication platform which connects one or more stakeholders to identify the one or more RCCA; and
implement the at least one RCCA for troubleshooting the problem.

3. The system of claim 1, wherein the processor is further configured to:
determine a quality score for the one or more RCCA being identified, the quality score provides a measure of effectiveness of the one or more RCCA in resolving the identified at least root cause; and update the database to store the one or more RCCA based on the quality score.

4. The system of claim 3, wherein the processor is further configured to:

review the RCCA form;

determine that the identified RCCA is successful in resolving the identified problem;

close the RCCA form; and store the RCCA form in the database.

5. The system of claim 1, wherein the user group includes one or more stakeholders who determine the additional RCCA and one or more users executing the application.

6. The system of claim 1, wherein the processor is further configured to:

provide a status update to the user on a rectification of identified root cause associated with problem in running the application.

7. The system of claim 1, wherein the processor is further configured to:

recommend the one or more RCCA based on the quality score for an identified problem.

8. A method for performing root cause analysis, comprising:

identifying at least one problem associated with running an application by at least one user, wherein identifying the problem includes determining a priority level of one or more services being impacted based on service level agreements;

identifying at least one root cause associated with the problem;

accessing a runbook to identify one or more root cause corrective actions (RCCA) associated with the root cause;

implementing at least one RCCA for troubleshooting the identified at least one problem;

generating a RCCA form for use by a user group for identifying and validating an additional RCCA;

determining a quality score of the RCCA for the additional RCCA;

updating a database to include the additional RCCA based on the quality score; and automatically initiating self-diagnosis to derive at least one additional corrective action when the RCCA is not available in the runbook for the root cause, wherein during the self-diagnosis comprising:

creating a new RCCA form;

auto-filling the new RCCA form at least based on a transcript of collaboration meetings and messages regarding the root cause, the RCCA exchanged over a communication platform; and identifying one or more RCCA different from the at least one RCCA for the identified at least one problem based on the transcript.

9. The method of claim 8, comprising:

implementing the RCCA for the identified root cause, based on identifying a procedure from the runbook;

wherein when the RCCA fails to rectify the root cause, further comprising:

identifying one or more parameters associated with the application and the identified at least one problem;

setting up the communication platform which connects one or more stakeholders to identify one or more additional RCCA; and implementing at least one additional RCCA for troubleshooting the problem.

10. The method of claim 8, further comprising:

determining a quality score for the one or more RCCA being identified, the quality score provides a measure of effectiveness of additional RCCA in resolving the identified root cause; and updating the database to store the additional RCCA based on the quality score.

11. The method of claim 10, comprising:

reviewing the RCCA form;

determining that the identified RCCA is successful in resolving the identified at least one problem;

closing the RCCA form; and storing the RCCA form in the database.

12. The method of claim 8, wherein the user group includes one or more stakeholders who determine the additional RCCA and one or more users executing the application.

13. The method of claim 8, comprising:

providing a status update to the user on a rectification of identified root cause associated with problem in running the application.

14. The method of claim 8, further comprising:

recommending one or more RCCA based on the quality score for an identified problem.

15. A non-transitory computer-readable storage medium storing program instructions for performing root cause analysis, the instructions, when executed, perform the steps of:

identifying at least one problem associated with running an application by at least one user, wherein identifying the problem includes determining a priority level of one or more services being impacted based on service level agreements;

identifying at least one root cause associated with the at least one problem;

accessing a runbook to identify one or more root cause corrective actions (RCCA) associated with the root cause;

implementing at least one RCCA for troubleshooting the identified at least one problem;

generating a RCCA form for use by a user group for identifying and validating an additional RCCA;

determining a quality score of the RCCA for the additional RCCA;

updating a database to include the additional RCCA based on the quality score; and automatically initiating self-diagnosis to derive at least one additional corrective action when the RCCA is not available in the runbook for the root cause, wherein during the self-diagnosis comprising:

creating a new RCCA form;

auto-filling the new RCCA form at least based on a transcript of collaboration meetings and messages regarding the root cause, the RCCA exchanged over a communication platform; and identifying one or more RCCA different from the at least one RCCA for the identified at least one problem based on the transcript.

16. The non-transitory computer-readable storage medium of claim 15, further comprising program instructions to perform the steps of:

implementing the RCCA for the identified root cause, based on identifying a procedure from the runbook;

wherein when the RCCA fails to rectify the root cause, further comprising:

identifying one or more parameters associated with the application and the identified at least one problem;

setting up the communication platform which connects one or more stakeholders to identify one or more additional RCCA; and implementing at least one additional RCCA for trouble-shooting the problem.

17. The non-transitory computer-readable storage medium of claim 15, further comprising program instructions to perform the steps of:

determining a quality score for the one or more RCCA being identified, the quality score provides a measure of effectiveness of additional RCCA in resolving the identified root cause; and updating the database to store the RCCA based on the quality score.

18. The non-transitory computer-readable storage medium of claim 15, further comprising program instructions to perform the steps of:

providing a status update to the user on a rectification of identified root cause associated with problem in running the application.

19. The non-transitory computer-readable storage medium of claim 15, further comprising program instructions to perform the steps of:

recommending the one or more RCCA based on the quality score for an identified problem.

20. The non-transitory computer-readable storage medium of claim 15, further comprising program instructions to perform the steps of:

reviewing the RCCA form;

determining that the identified RCCA is successful in resolving the identified at least one problem;

closing the RCCA form; and storing the RCCA form in the database.

* * * * *